(12) United States Patent
Lavender

(10) Patent No.: US 10,759,687 B1
(45) Date of Patent: Sep. 1, 2020

(54) TANK WATER TREATMENT SYSTEM AND METHOD OF USE

(71) Applicant: Chad Lavender, McKinney, TX (US)

(72) Inventor: Chad Lavender, McKinney, TX (US)

(*) Notice: Subject to any disclaimer, the term of this patent is extended or adjusted under 35 U.S.C. 154(b) by 57 days.

(21) Appl. No.: 15/730,522

(22) Filed: Oct. 11, 2017

Related U.S. Application Data

(60) Provisional application No. 62/406,583, filed on Oct. 11, 2016.

(51) Int. Cl.
| | |
|---|---|
| *C02F 1/28* | (2006.01) |
| *C02F 9/00* | (2006.01) |
| *C02F 1/00* | (2006.01) |

(52) U.S. Cl.
CPC .............. *C02F 9/005* (2013.01); *C02F 1/006* (2013.01); *C02F 1/28* (2013.01); *C02F 2201/006* (2013.01)

(58) Field of Classification Search
CPC .......... C02F 1/0006; C02F 1/28; C02F 9/005; C02F 1/048; B63J 1/00; A61J 1/10; A61J 1/18; A61J 2200/70; A61J 2205/20; B65D 33/004; G01D 7/005
See application file for complete search history.

(56) References Cited

U.S. PATENT DOCUMENTS

| | | | |
|---|---|---|---|
| 4,298,475 A * | 11/1981 | Gartner ................... | C02F 1/766 210/266 |
| 9,989,474 B2 * | 6/2018 | Song .................... | G01N 31/221 |

* cited by examiner

*Primary Examiner* — Sharon Pregler
(74) *Attorney, Agent, or Firm* — Eldredge Law Firm

(57) ABSTRACT

A water tank treatment system includes a water tank having an inner cavity for storing water therein, the water tank having a threaded opening; and a treatment device with a body forming an inner area, the body is configured to threadingly attach to the threaded opening; an absorbent material disposed within the inner area, the absorbent material is configured to absorb and treat acidic gas passing through the threaded opening; and a color changing indicator extending through a thickness of the body and in communication with the absorbent material.

1 Claim, 4 Drawing Sheets

TANK WATER TREATMENT SYSTEM AND METHOD OF USE

BACKGROUND

1. Field of the Invention

The present invention relates most generally to water treatment systems, and more specifically, to a treatment system removably attached to a portable tank.

2. Description of Related Art

Tanks for storing liquids are well known in the art and are effective means to transport liquid. FIG. 1 is a front view of a conventional tank 101 having a body 103 that forms an inner area 105 for storing liquid 107 therein. An ullage space 109 is typically found within the inner storage area 105 between the liquid 107 and an inner surface of the body 103. An opening 111 provides access to inner storage area 105 and is usually threaded.

It should be understood that commercial tanks 101 can be utilized to carry fluids 107. It should be understood that these commercial tanks (commonly referred to as IBCs, Intermediate Bulk Containers or totes) can hold oxidizers such as Sodium Hypochlorite (bleach), Hydrogen Peroxide, Chlorine Dioxide or any other chemical which could contain characteristics which create chemical vapors within the tote or which could vent from the tote. After a duration of time, the fluid creates gases that collect in the ullage area 109. The harmful gases can cause damage to the tank and/or escape through opening 111, resulting in damage to the environment and/or harm to persons nearby. Accordingly, there is a need to continuously treat the gases. Although the tanks are effective in most application in the art, significant shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
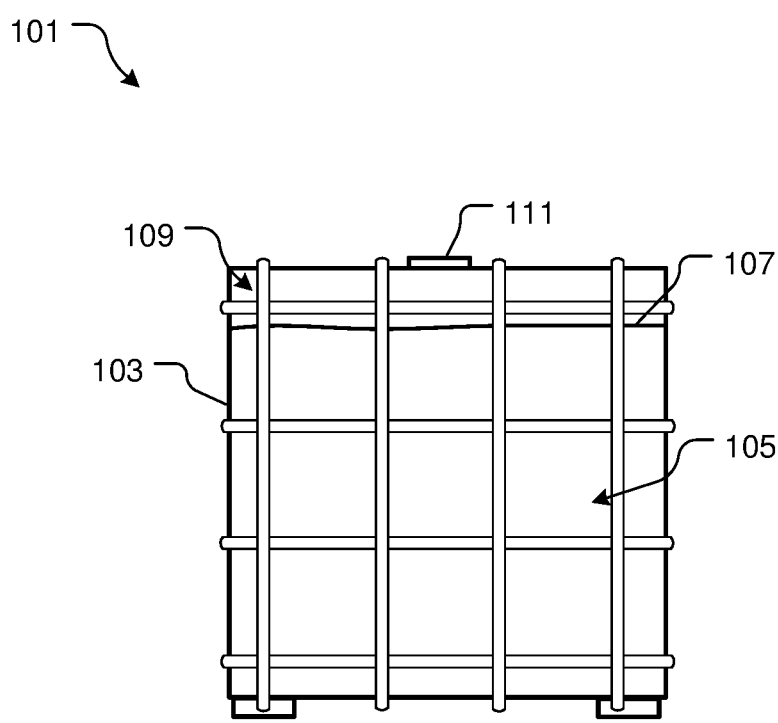
FIG. 1 is a front view of a storage tank.
Figure 2:
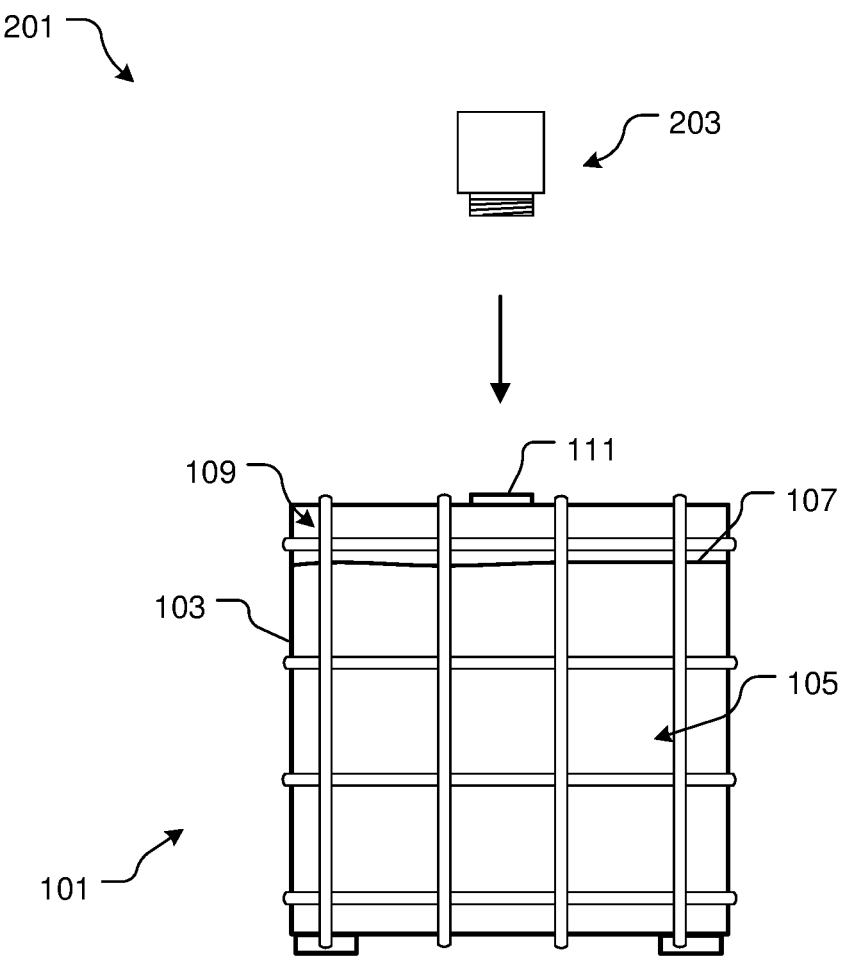
FIG. 2 is a front view of a storage tank and a treatment system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

In the preferred embodiment, the system and method of use of the present invention is directed to acidic fluids; however, it should be understood that the features discussed herein could target chemical vapors to remove such as chlorine dioxide. It should be understood that the chemical chlorine dioxide (CLO2) cannot be transported over 3000 ppm due to the gaseous nature of the aqueous solution. Moreover, CLO2 must be created on site, and used quickly because of this gas. This implies that the industry needs multiple mobile units to carry the precursors (in this case hydrochloric acid and sodium chlorite but there are multiple ways to produce CLO2). The CLO2 will oxidize and gas to atmosphere over time and creates a big hazard as that "vapor cloud" is very corrosive and causes respiratory irritants.

The purpose of the invention would allow that CLO2 to gas off from the tank holding the aqueous solution. This would eliminate the hazardous nature of the gas process as it will absorb, neutralize and indicate exhaustion of the impregnated material. The implication for business is to control the gas and remove that hazard, then you could create CLO2 and store it on a site, rather than use it immediately. This would allow one "mobile unit" to produce CLO2 at multiple sites and store that CLO2 there for future use. These features are discussed more fully below.

Referring now to the drawings wherein like reference characters identify corresponding or similar elements throughout the several views, FIGS. 2-6 depict various views of a gas treatment system 201 and method of use in accordance with a preferred embodiment of the present application. It will be appreciated that the system 201 overcomes one or more of the above-listed problems commonly associated with the conventional liquid storage tanks. Detailed explanation of these differences and unique features of the system 201 are discussed below with reference to the accompanying drawings.

System 201 includes tank 101 along with a gas treatment device 203 removably secured thereto. In the preferred embodiment, the treatment device 203 is removably secured to the opening 111 of the tank 101; thus, the treatment device 203 is contemplated being utilized in conjunction with various types of tanks having different shapes and sizes. During use, the treatment device 203 is merely attached to the opening 111 and configured to treat harmful gases accumulating in ullage 109 and thereafter disposed of the treated gases via an absorbent material configured to neutralize the acid within the gas. These features more fully discussed below and shown in the accompanying drawings. Although described as used with acidic fluid, it will be appreciated that the features discussed herein could be utilized with other fluids in lieu of the exemplary acidic fluid. For example, CLO2 is the most important gas that the system targets. It is important to note, the impregnation material for the device will change based on what target gas we are trying to absorb, neutralize and indicate.

Figure 3:
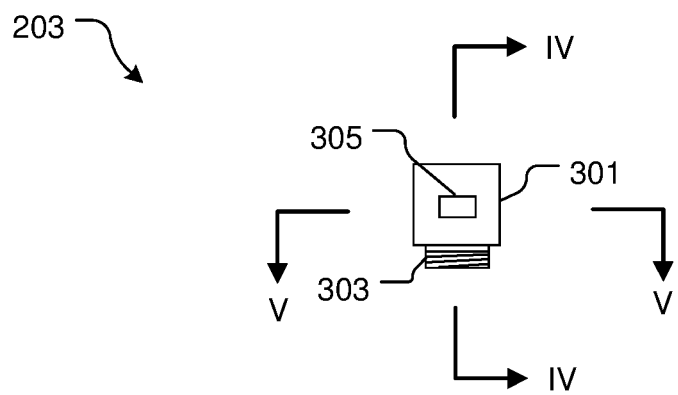
FIG. 3 is a front view of a gas treatment device of the system of FIG. 2.

In FIG. 3, a front view of the treatment device 203 is shown having a housing 301 with an attachment device 303 rigidly secured thereto. During assembly, the attachment device 303 is removably attached to opening 111. In the exemplary embodiment, the attachment device 303 includes a plurality of threads configured to threadedly engage with the opening 111; however, alternative embodiments could include different types of quick-release device in lieu of the preferred embodiment.

One of the unique features believed characteristic of the present invention is the use of a pH indicator 305 secured to housing 301 and in communication with the absorbent material 403 disposed within the housing 305. During use, the absorbent material 403 treats the acidic gases, which in turn activates the indicator 305. The indicator provides visual notice to the user that the acidic gases are being treated and for notification that a new treatment device is necessary. The user can merely remove the used treatment device from the tank and replace it with a new treatment device.

Although the system can utilize a separate device to measure pH and send a signal, the preferred method is to have the pH indicator as part of the absorbent/neutralizer blend that the device is impregnated with. The device could include a clear window so that the color change is visible. In some cases, like CLO2, it may not be a pH change, but a different reaction which indicated that the impregnation material is exhausted and needs to be replaced. When using the device for acid, it is a very easy reaction to visually indicate with pH indicators. The system is hereby adapted to target any gas and change the neutralizer/absorbent blend for that specifically targeted blend.

Figures 4A, 4B:
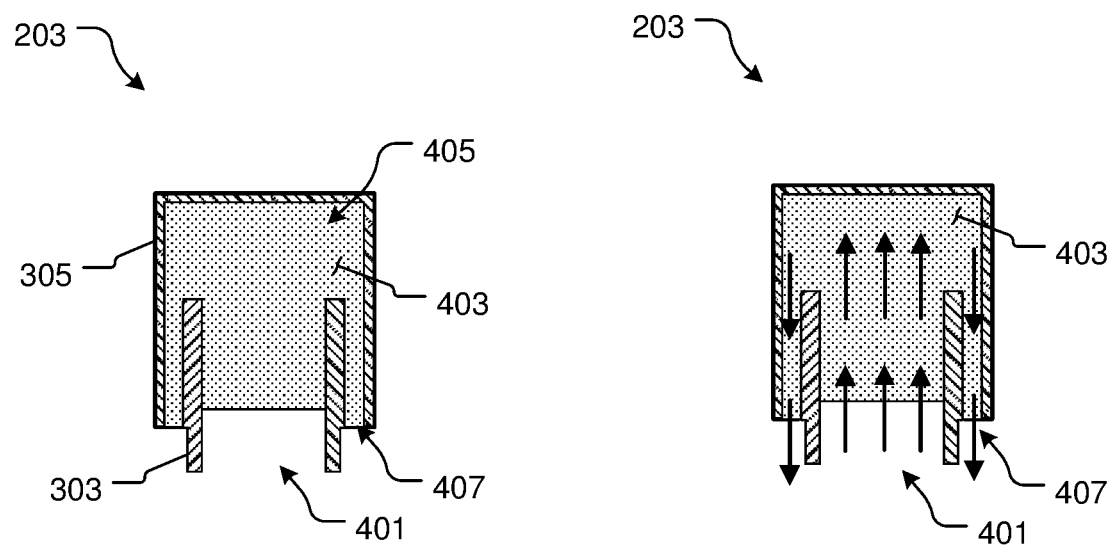
FIGS. 4A and 4B are cross-sectional view of the treatment device of FIG. 3 taken at IV-IV.

In FIGS. 4A and 4B, side views of a cross-sectional area of treatment device 203 are shown. The attachment device 303 forms an opening 401 in gaseous communication with the inner area of the tank via opening 111. Likewise, the housing 305 forms a cavity 405 in communication with opening 401. An absorbent material 403 is disposed partially within opening 401 and cavity 405. It should be understood that the system is intended to use an absorbent material in conjunction with a neutralizing material with an indicator showing that the material is exhausted (in most cases a pH indicator).

As shown with a plurality arrows in FIG. 4B, the gases enter opening 401, travel through the absorbent material 403, and leave through an exit passage 407. The absorbent material is composed of an acid neutralizing material, which in turn treats and removes the acid from the gases passing therethrough.

Figure 5:
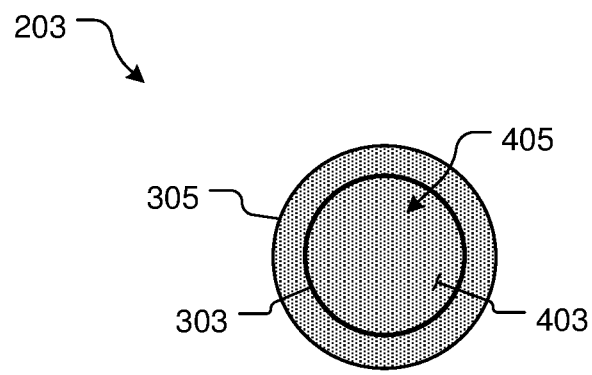
FIG. 5 is a cross-sectional view of the treatment device of FIG. 3 taken at V-V. diagram of the fluid treatment system of FIG. 2.

A top cross-sectional view of device 203 is shown in FIG. 5. In the exemplary embodiment, the device 203 is cylindrical in shape; however, it will be appreciated that alternative embodiments could include different shapes and sizes.

Figure 6:
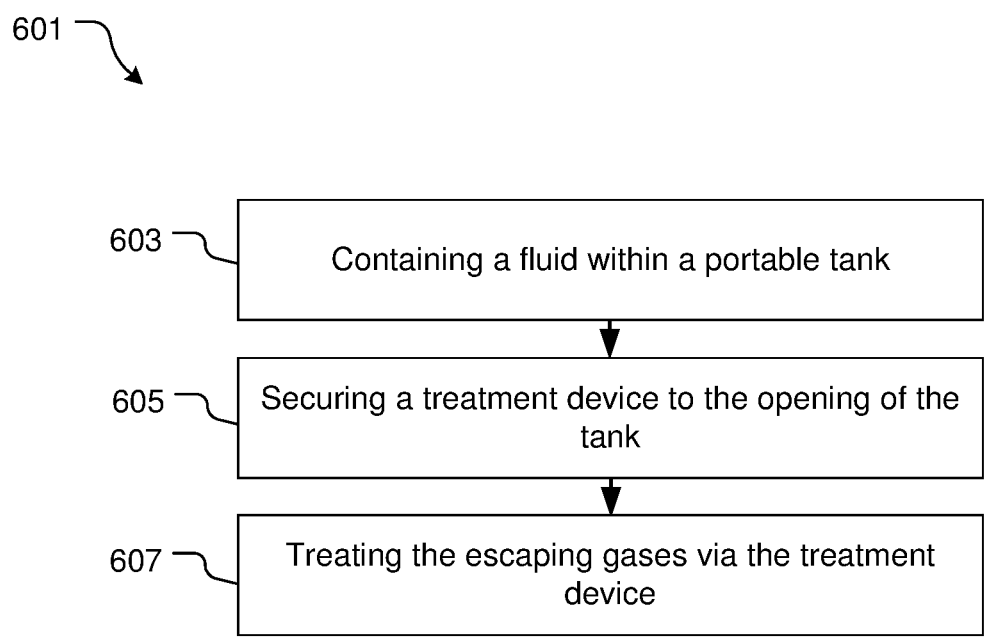
FIG. 6 is a flowchart depicting the preferred method of use.

In FIG. 6, a flowchart 601 depicting the preferred method of use is shown with the process of first containing the fluid within the portable tank and thereafter securing a treatment device to the portable tank, as depicted in boxes 603, 605. Thereafter, the gases are treated with the absorbent material carried within the treatment device, as depicted in box 607.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A water tank treatment system, comprising:
   a water tank having an inner cavity for storing water therein, the water tank having a threaded opening; and
   a treatment device, having:
      a body forming an inner area, the body is configured to threadingly attach to the threaded opening, the body forming a first channel and a second channel, the second channel extends around a periphery of the first channel;
      an absorbent material disposed within the inner area, the absorbent material is configured to absorb and treat acidic gas passing through the threaded opening from within the inner cavity of the water tank; and
      a color changing indicator extending through a thickness of the body of the treatment device and in communication with the absorbent material of the second channel, the color changing indicator is visible from outside the body of the treatment device;
   wherein acidic gas leaving the water tank passes through the threaded opening via the first channel and into the absorbent material, then leaves via the second channel, which in turn changes a color of the indicator.

* * * * *